US012776241B2

(12) United States Patent
Nasu

(10) Patent No.: US 12,776,241 B2
(45) Date of Patent: Oct. 27, 2026

(54) INFORMATION PROVIDING SYSTEM FOR VEHICLES, INFORMATION PROVIDING METHOD FOR VEHICLES, AND RECORDING MEDIUM

(71) Applicant: Panasonic Automotive Systems Co., Ltd., Kanagawa (JP)

(72) Inventor: Atsuya Nasu, Hyogo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 113 days.

(21) Appl. No.: 18/796,938

(22) Filed: Aug. 7, 2024

(65) Prior Publication Data

US 2024/0395188 A1 Nov. 28, 2024

Related U.S. Application Data

(63) Continuation of application No. PCT/JP2023/029462, filed on Aug. 14, 2023.

(30) Foreign Application Priority Data

Sep. 8, 2022 (JP) ................................ 2022-142923

(51) Int. Cl.
*G09G 3/20* (2006.01)
*B60K 35/60* (2024.01)

(52) U.S. Cl.
CPC ............ *G09G 3/2092* (2013.01); *B60K 35/60* (2024.01); *B60K 2360/182* (2024.01);
(Continued)

(58) Field of Classification Search
CPC ........... G09G 3/2092; G09G 2300/026; G09G 2340/0442; G09G 2340/045;
(Continued)

(56) References Cited

U.S. PATENT DOCUMENTS

2011/0081047 A1 4/2011 Momosaki
2011/0267452 A1* 11/2011 Notsu ................. H04N 19/115 382/104
(Continued)

FOREIGN PATENT DOCUMENTS

JP 2005-284886 10/2005
JP 2011-082641 4/2011
JP 2020-161896 10/2020

OTHER PUBLICATIONS

International Search Report issued in International Pat. Appl. No. PCT/JP2023/029462, dated Oct. 31, 2023, along with an English translation thereof.
(Continued)

*Primary Examiner* — King Y Poon
(74) *Attorney, Agent, or Firm* — Greenblum & Bernstein, P.L.C.

(57) ABSTRACT

An information providing system for vehicles is an information providing system for vehicles that controls a display mode of an application image to be displayed in a first display area and a second display area provided in a vehicle, and the information providing system for vehicles includes: a display change determiner that determines dividing areas for dividing an application image that is zoomed out, to obtain blocks that correspond, respectively, to the first display area and the second display area, such that the dividing areas have an aspect ratio equal to each of a resolution of the first display area and a resolution of the second display area; and a display controller that adjusts and displays the blocks divided in accordance with the dividing areas to correspond, respectively, to the first display area and the second display area.

10 Claims, 8 Drawing Sheets

(52) U.S. Cl.
CPC ................. *G09G 2300/026* (2013.01); *G09G 2340/0442* (2013.01); *G09G 2340/045* (2013.01); *G09G 2340/0464* (2013.01); *G09G 2354/00* (2013.01); *G09G 2360/04* (2013.01); *G09G 2380/10* (2013.01)

(58) Field of Classification Search
CPC ....... G09G 2340/0464; G09G 2354/00; G09G 2360/04; G09G 2380/10; B60K 35/60; B60K 2360/182
See application file for complete search history.

(56) References Cited

U.S. PATENT DOCUMENTS

2012/0050468 A1* 3/2012 Takahashi ............ H04N 13/341 348/43
2023/0300476 A1* 9/2023 Fujioka ..................... G06T 7/90
2024/0042858 A1* 2/2024 Kamiya ................... G09G 5/36

OTHER PUBLICATIONS

Office Action from Japan Patent Office (JPO) in Japanese Patent Appl. No. 2022-142923, dated Aug. 19, 2025, together with an English language translation.

* cited by examiner

INFORMATION PROVIDING SYSTEM FOR VEHICLES, INFORMATION PROVIDING METHOD FOR VEHICLES, AND RECORDING MEDIUM

CROSS REFERENCE TO RELATED APPLICATIONS

This is a continuation application of PCT International Application No. PCT/JP2023/029462 filed on Aug. 14, 2023, designating the United States of America, which is based on and claims priority of Japanese Patent Application No. 2022-142923 filed on Sep. 8, 2022.

FIELD

The present disclosure relates to an information providing system for vehicles, an information providing method for vehicles, and a recording medium.

BACKGROUND

Along with the advancement of information providing systems for vehicles in recent years, the number of onboard displays within the interior of vehicles has been rising. This trend has prompted the desire for technologies that, using a plurality of onboard displays, display enlarged application images, such as navigation and television images, to improve their viewability. Thus, the size of an application image and the rendering processing load tend to increase or decrease depending on the scale of collaboration of a plurality of onboard displays.

Patent Literature (PTL 1) discloses a distribution server that divides an image into partial images on the receiver's side and then displays the partial images, in order to reduce the load on the distributor's side.

CITATION LIST

Patent Literature

PTL 1: Japanese Unexamined Patent Application Publication No. 2020-161896

SUMMARY

However, the distribution server according to PTL 1 above can be improved upon.

Accordingly, the present disclosure is directed to providing an information providing system for vehicles and so on are capable of improving upon the above related art.

An information providing system for vehicles according to one aspect of the present disclosure is an information providing system for vehicles that controls a display mode of an application image to be displayed in a first display area and a second display area provided in a vehicle, and the information providing system for vehicles includes: a display change determiner that determines dividing areas for dividing the application image that is zoomed out, to obtain blocks that correspond, respectively, to the first display area and the second display area, such that the dividing areas have an aspect ratio equal to each of a resolution of the first display area and a resolution of the second display area; and a display controller that adjusts and displays the blocks divided in accordance with the dividing areas to correspond, respectively, to the first display area and the second display area.

Meanwhile, an information providing method for vehicles according to one aspect of the present disclosure is an information providing method for vehicles that controls a display mode of an application image to be displayed in a first display area and a second display area provided in a vehicle, and the information providing method for vehicles includes: determining dividing areas for dividing the application image that is zoomed out, to obtain blocks that correspond, respectively, to the first display area and the second display, such that the dividing areas have an aspect ratio equal to each of a resolution of the first display area and a resolution of the second display area; and adjusting and displaying the blocks divided in accordance with the dividing areas to correspond, respectively, to the first display area and the second display area.

A recording medium according to one aspect of the present disclosure is a non-transitory computer-readable recording medium having recorded thereon a program for causing a computer to execute an information providing method for vehicles.

The information providing system for vehicles and so on according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
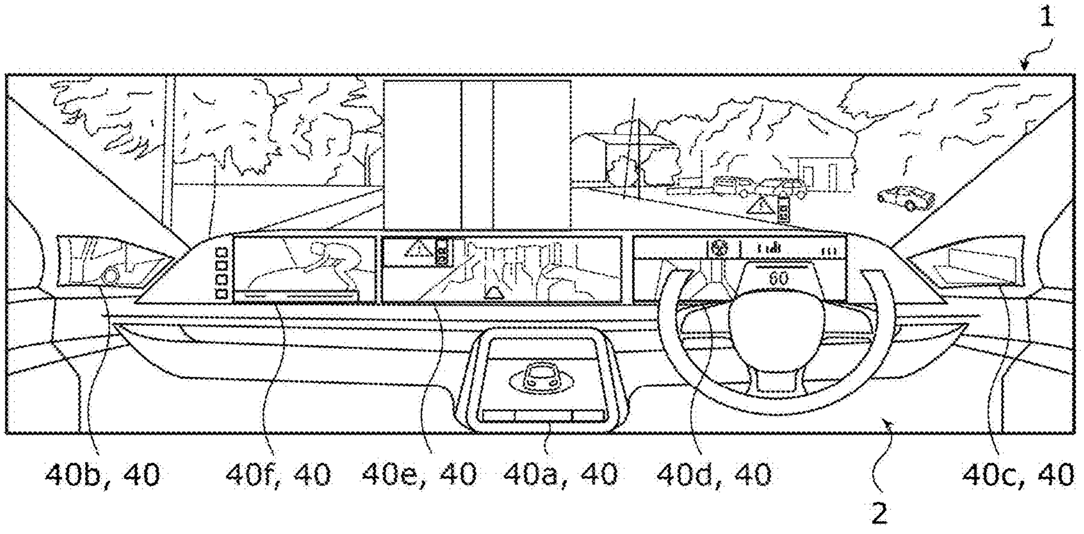
FIG. 1 is a schematic diagram showing a display system according to an embodiment that is provided in a vehicle.

The embodiments described below merely illustrate general or specific examples. The numerical values, the shapes, the materials, the constituent elements, the arrangement positions and the connection modes of the constituent elements, the steps, the order of the steps, and so on illustrated in the following embodiments are examples and are not intended to limit the present disclosure. Among the constituent elements described in the following embodiments, any constituent elements that are not cited in the independent claims are to be construed as optional constituent elements.

Moreover, the drawings are schematic diagrams and do not necessarily provide exact depictions. Furthermore, in the drawings, identical constituent elements are given identical reference characters.

An embodiment will be described below in specific terms with reference to the drawings.

EMBODIMENT

Configuration and Function

First, display system 1 according to the present embodiment will be described with reference to FIG. 1 to FIG. 6.

Figure 2:
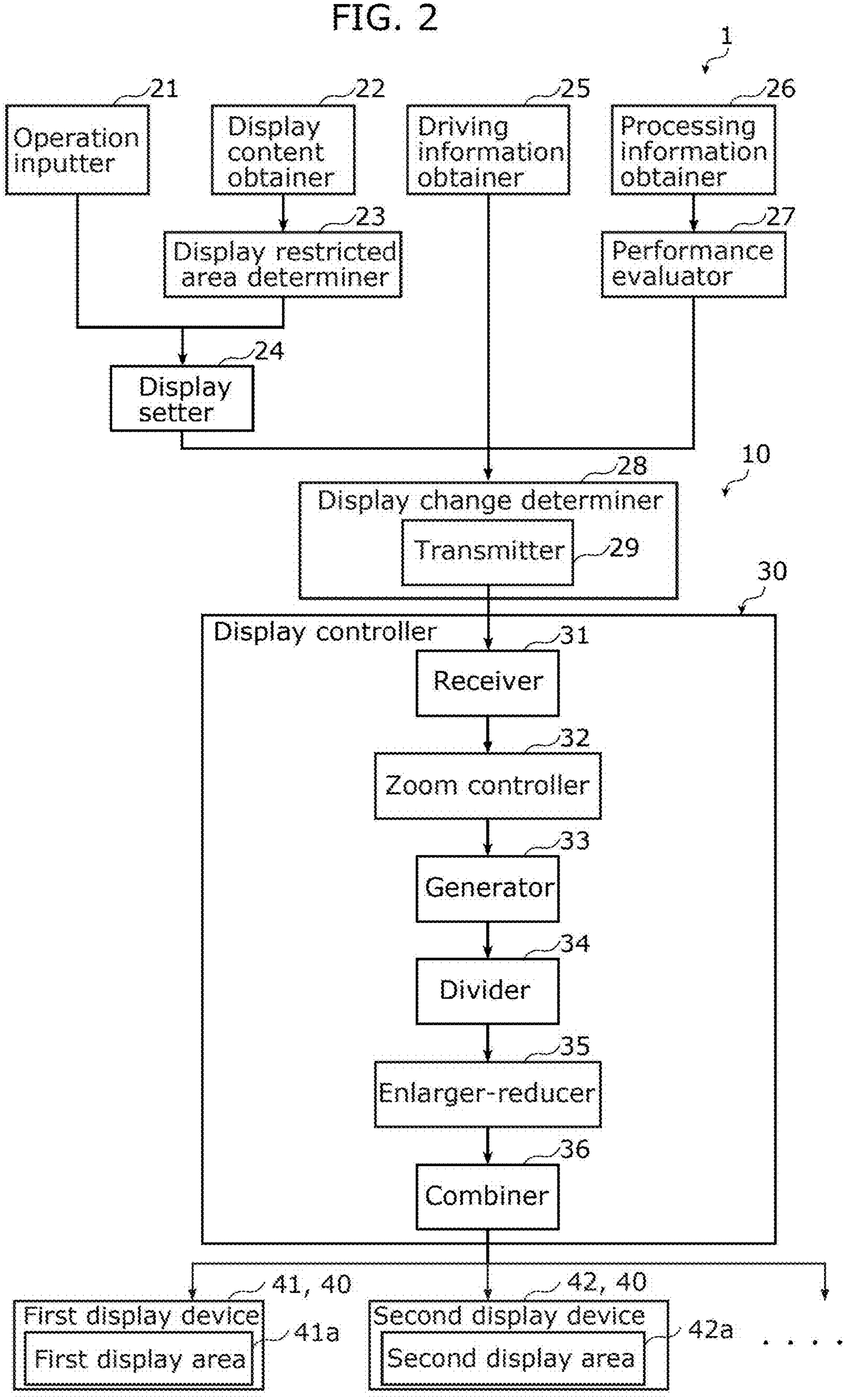
FIG. 2 is a block diagram showing a display system according to an embodiment.
Figure 3:
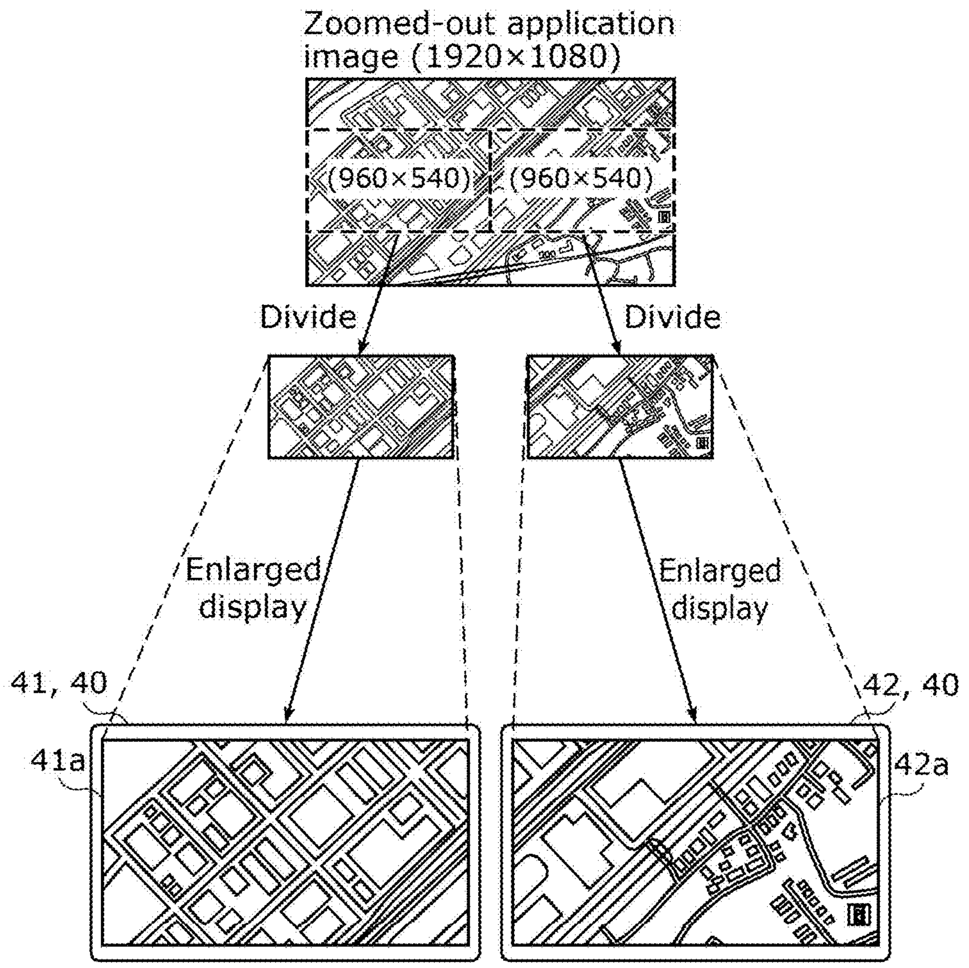
FIG. 3 is a diagram showing how divided blocks cut out from an application image are displayed in a zoomed-in view separately in respective display areas.
Figure 4:
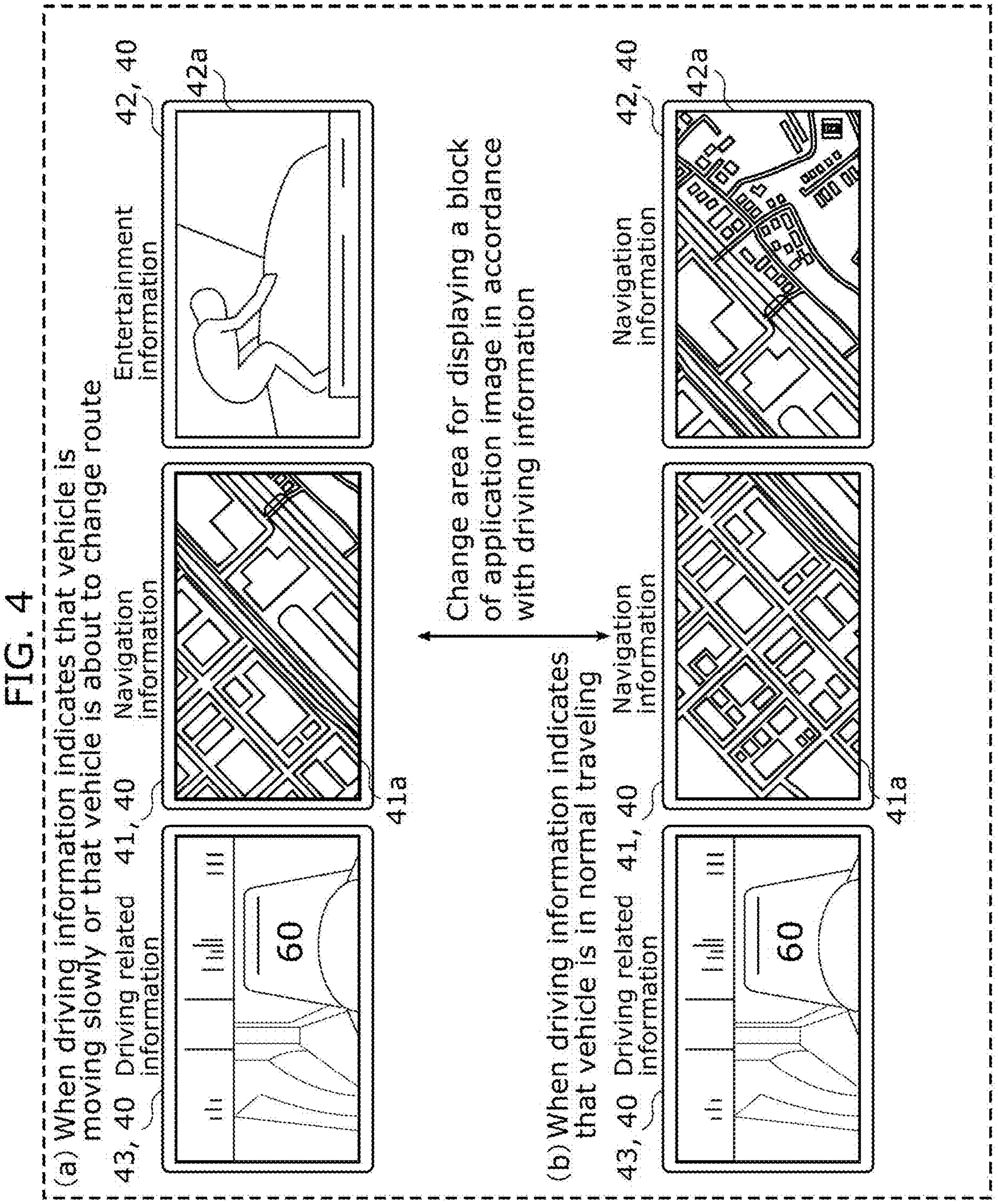
FIG. 4 is a diagram showing how the area in which a block of an application image is displayed is changed in accordance with driving information.
Figure 5:
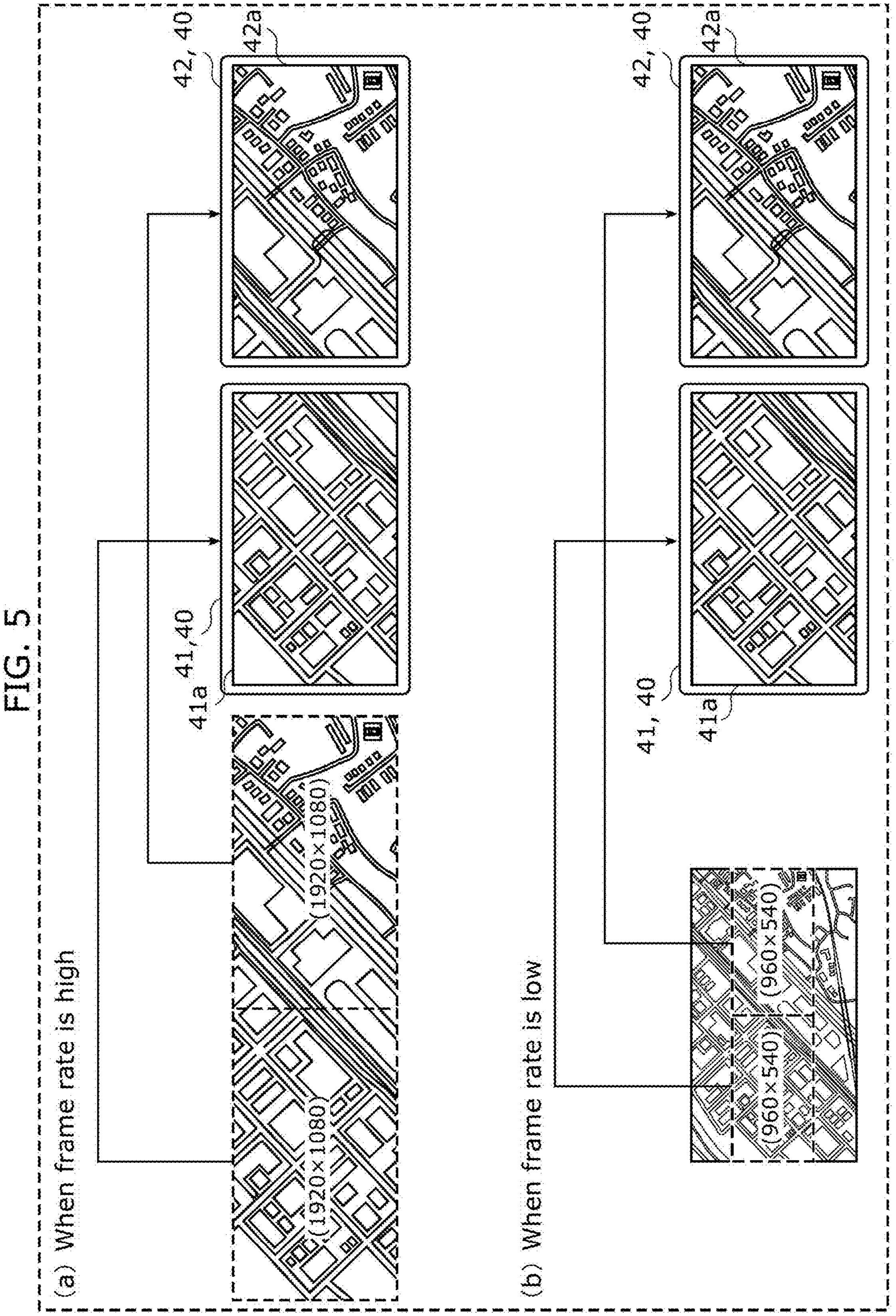
FIG. 5 is a diagram showing how an application image is displayed in a display area in accordance with the frame rate.
Figure 6:
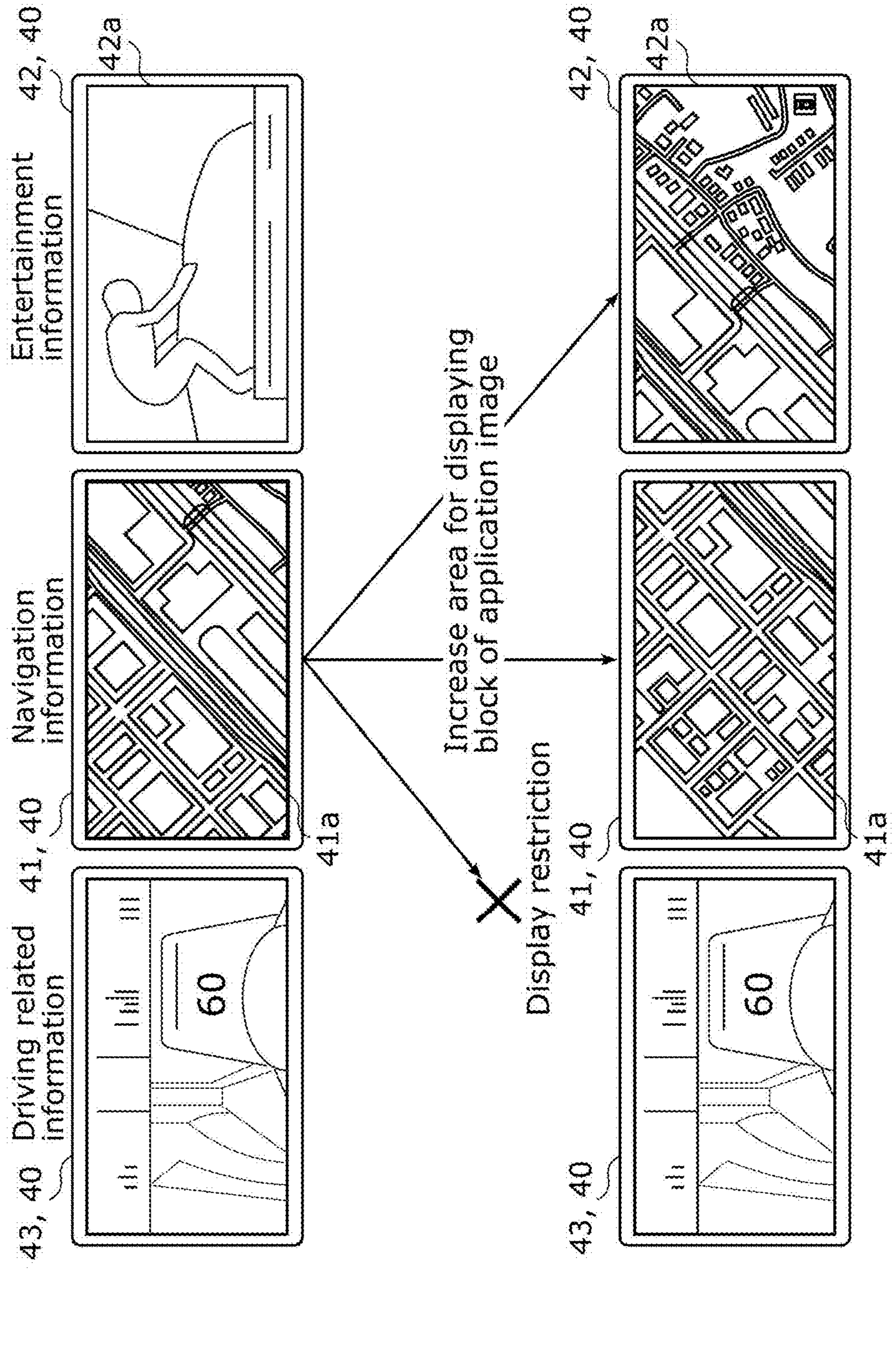
FIG. 6 is a diagram showing how information other than driving related information is kept from being displayed in a display restricted area.

FIG. 1 is a schematic diagram showing display system 1 according to the embodiment that is provided in vehicle 2. FIG. 2 is a block diagram showing display system 1 according to the embodiment. FIG. 3 is a diagram showing how divided blocks cut out from an application image are displayed in a zoomed-in view separately in respective display areas. FIG. 4 is a diagram showing how the area in which a block of an application image is displayed is changed in accordance with driving information. FIG. 5 is a diagram showing how an application image is displayed in a display area in accordance with the frame rate. FIG. 6 is a diagram showing how information other than driving related information is kept from being displayed in a display restricted area. In FIG. 4 and FIG. 6, first display device 41, second display device 42, and third display device 43 are shown as an example of a plurality of display devices 40.

As shown in FIG. 1, display system 1 is a system for displaying one of a plurality of images on the display screen of each of one or more display devices 40. In display system 1, the position of each of a plurality of images displayed in the corresponding display screen of one or more display devices 40 can be set automatically or can be set manually by the vehicle's occupant.

Display system 1 is used, for example, in vehicle 2 in which one or more display devices 40 are provided. Therefore, according to the present embodiment, a plurality of images are images that are displayed based on applications and include information about, for example but not limited to, a meter for the vehicle, an operation condition of an onboard device, navigation information, a captured image, or surrounding vehicle information. A meter for the vehicle is, for example but not limited to, a speedometer, a direction indicator light, a warning light, an odometer, a shift position indicator, a fuel gauge, or a water temperature meter. An onboard device is, for example but not limited to, an audio device, an onboard lighting device, or a seat device. Navigation information is information for, for example but not limited to, informing the driver of the current position of traveling vehicle 2 or guiding the driver to a destination. A captured image is an image of the surroundings or the interior of vehicle 2 captured by an imaging device provided in vehicle 2. Surrounding vehicle information is information indicating, for example but not limited to, the presence or absence of, the number of, or the speed of other vehicles in the surroundings of vehicle 2 or the distance to other vehicles from vehicle 2.

Specifically, display system 1 includes a plurality of display devices 40, operation inputter 21, display content obtainer 22, display restricted area determiner 23, display setter 24, driving information obtainer 25, processing information obtainer 26, performance evaluator 27, and information providing system 10 for vehicles. In the example illustrated in FIG. 2, display system 1 includes first display device 41 and second display device 42 as an example of the plurality of display devices 40. According to the present embodiment, first display device 41 and second display device 42 may collectively be referred to simply as display devices 40. In the description according to the present embodiment, first display device 41 and second display device 42 are used mainly as an example of the plurality of display devices 40, unless specifically indicated otherwise. Therefore, the plurality of display devices 40 according to the present embodiment are not limited to first display device 41 and second display device 42 and may include three or more display devices 40. The expression "first display device 41 and second display device 42" can be replaced with a plurality of display devices 40.

First Display Device 41 and Second Display Device 42

First display device 41 and second display device 42 are each a display device of, for example, a personal computer (PC) provided with a liquid crystal display or the like, a mobile terminal such as a smartphone, a car navigation system provided in vehicle 2, an electron mirror system, or a multi-information display.

In FIG. 1, car navigation system 40*a* disposed in the center portion in the vehicle's width direction, an electron mirror system that functions as left sideview mirror 40*b* and right sideview mirror 40*c*, and a plurality of multi-information displays 40*d*, 40*e*, and 40*f* are illustrated as examples of the plurality of display devices 40. These display devices 40 are arranged side by side so that an occupant of vehicle 2 can see the plurality of display devices 40 at once.

When the plurality of display devices 40 are provided side by side in vehicle 2, the plurality of display devices 40 can collectively display a single image or can each display a separate image, as the plurality of display devices 40 are controlled by display system 1 so as to collaborate with each other.

As shown in FIG. 2, first display device 41 includes first display area 41*a*. Meanwhile, second display device 42 includes second display area 42*a*. In the example illustrated according to the present embodiment, one display device 40 includes one display area. Alternatively, one display device 40 may include two or more display areas. In the description according to the present embodiment, first display area 41*a* and second display area 42*a* are used mainly as an example of a plurality of display areas, unless specifically indicated otherwise. Therefore, the plurality of display areas according to the present embodiment are not limited to the two display areas of first display area 41*a* and second display area 42*a* and may include three or more display areas. The expression "first display area 41*a* and second display area 42*a*" can be replaced with a plurality of display areas.

First display area 41*a* and second display area 42*a* each display a graphical user interface (GUI) for, for example, operating on an image, such as a car navigation map, a menu image of various onboard devices, or a search image.

Operation Inputter 21

Operation inputter 21 is an input interface that receives an input of a user operation. For example, operation inputter 21 receives a setting input from a user for processing and displaying an application image in each of the plurality of display areas. A setting input is, for example but not limited to, a designated display on which a processed application image is to be displayed, a display mode of an application image in a designated display, or a permission for a dynamic setting change. Operation inputter 21 outputs a received setting input to display setter 24. A designated display is a display area, among the plurality of display areas, in which a processed application image is to be displayed. A display mode is, for example, the display position of an application image or the size of an application image. A permission for a dynamic setting change will be described later.

Display Content Obtainer 22

Display content obtainer 22 obtains, from an application or the like, an application image to be displayed in each of the plurality of display areas. Display content obtainer 22 outputs an obtained application image to display restricted area determiner 23.

Display Restricted Area Determiner 23

Display restricted area determiner 23 determines, from among the plurality of display areas, a display area other than a display area reserved for displaying driving related information. In other words, display restricted area determiner 23 determines the display area reserved for displaying driving related information as a display restricted area. Driving related information is information related to the safety of traveling of vehicle 2 and is, for example, information about a meter for the vehicle. The display restricted area is a display area reserved for displaying the driving related information and is an area in which no image other than the driving related information is displayed. This configuration can limit such a setting configured by the user that causes an image other than the driving related information to be displayed in the display restricted area reserved for displaying the driving related information.

Furthermore, display restricted area determiner 23 determines a display area other than the display area reserved for displaying the driving related information as a display target area. A display target area is a display area other than the display area reserved for displaying the driving related information and is, for example, an area that displays the operation condition of an onboard device or navigation information.

Display restricted area determiner 23 outputs an application image obtained from display content obtainer 22 and area identification information for identifying the display restricted area to display setter 24.

Display Setter 24

Display setter 24 obtains a setting input from operation inputter 21 and obtains an application image and area identification information from display restricted area determiner 23. Display setter 24 generates setting information based on the setting input, the application image, and the area identification information. The setting information is, for example but not limited to, a designated display on which the application image is displayed, a display mode of the application image in the designated display, or a permission for a dynamic setting change. Display setter 24 outputs the application image and the setting information to display change determiner 28.

Driving Information Obtainer 25

Driving information obtainer 25 obtains, for example, driving information from, for example, an electronic control unit (ECU) or an onboard sensor provided in vehicle 2. The ECU includes, for example, a central processing unit (CPU) and a graphics processing unit (GPU). The driving information is information related to the traveling of vehicle 2. Specifically, the driving information includes, for example, the presence or absence of the driving state of vehicle 2 by the user, the presence or absence of normal traveling of vehicle 2, or the traveling speed of vehicle 2. The driving state of vehicle 2 by the user means the state in which, unlike in normal traveling, the user is operating vehicle 2 cautiously and includes, for example, a state in which vehicle 2 is moving slowly, a state in which vehicle 2 is about to change its traveling route, or a state in which vehicle 2 is entering an intersection. Normal traveling includes, for example, a case in which vehicle 2 is traveling on and along an ordinary road or an expressway. Driving information obtainer 25 outputs obtained driving information to display change determiner 28.

Processing Information Obtainer 26

Processing information obtainer 26 obtains, for example, processing information of vehicle 2 from, for example, the ECU provided in vehicle 2. The processing information includes, for example, the usage ratio of the CPU, the usage ratio of the GPU, the used memory capacity, and the network bandwidth. Processing information obtainer 26 outputs obtained processing information to performance evaluator 27.

Performance Evaluator 27

Performance evaluator 27 successively analyzes obtained processing information and thus estimates the frame rate based on the processing information pertaining to each of first display area 41*a* and second display area 42*a*. Performance evaluator 27 outputs the estimated frame rate to display change determiner 28.

Information Providing System 10 for Vehicles

Information providing system 10 for vehicles controls the display mode of an application image to be displayed in first display area 41*a* and second display area 42*a* provided in vehicle 2. Information providing system 10 for vehicles includes display controller 30 and display change determiner 28 that includes transmitter 29 capable of transmitting, for example, an application image to display controller 30. The display mode includes, for example, a designated display of an application image that serves as a display target area, the display mode of the application image in the designated display, and a dividing area used when a block is divided and cut out from the application image.

Display change determiner 28 obtains from display setter 24 an application image and setting information for displaying the application image in the display target area, obtains driving information from driving information obtainer 25, and obtains the frame rate from performance evaluator 27.

Furthermore, display change determiner 28 determines the presence or absence of a display change based on the obtained setting information. When the obtained setting information indicates that a setting change is to be made to the current setting, display change determiner 28 determines that the user has indicated a display change. When there is a display change, display change determiner 28 determines the display mode.

Specifically, in order to process and display an application image in a display target area, display change determiner 28 determines the designated display of the application image that serves as the display target area and the display mode of the application image. Furthermore, display change determiner 28 determines the dividing area of the application image in a zoomed-out view such that the dividing area has the aspect ratio equal to each of the resolution of first display area 41*a* and the resolution of second display area 42*a*. In determining the dividing area, display change determiner 28 determines dividing areas for dividing the zoomed-out application image to obtain blocks that correspond, respectively, first display area 41*a* and second display area 42*a*. A block is at least a part of a zoomed-out application image.

For example, as shown in FIG. 3, display change determiner 28 obtains an application image that is zoomed out without a change in the size of the application image. Display change determiner 28 determines the resolution of 960×540 for a dividing area for dividing the application image to obtain a block. In FIG. 3, display change determiner 28 determines dividing areas for dividing the application image to obtain two blocks that correspond to first display area 41*a* and second display area 42*a*.

With this configuration, display change determiner 28 determines, as per the content of the setting input designated by the user, the display mode indicating the designated display of the application image that serves as the display target area and the display mode of and the dividing area for the application image.

Display change determiner 28 transmits a display event indicating the determined display mode and the application image from transmitter 29 to display controller 30.

Furthermore, as shown in FIG. 4, display change determiner 28 may determine one or more display target areas for displaying a block from among first display area 41*a* and second display area 42*a* based on the driving information pertaining to the traveling of vehicle 2. Furthermore, display change determiner 28 may determine one or more dividing areas for dividing an application image to obtain one or more blocks corresponding to the determined one or more display target areas such that each dividing area has the aspect ratio equal to each of the resolution of first display area 41*a* and the resolution of second display area 42*a*.

Specifically, in the example illustrated in (a) of FIG. 4, in order to reduce the area that displays the block of the application image, third display device 43 displays driving related information, first display device 41 displays navigation information, and second display device 42 displays entertainment information.

Meanwhile, in the example illustrated in (b) of FIG. 4, in order to increase the area that displays the block of the application image, third display device 43 displays driving related information, and first display device 41 and second display device 42 display navigation information.

For example, in the example shown in (a) of FIG. 4, in contrast to the example shown in (b) of FIG. 4, when the driving information indicates, as the driving state of vehicle 2 by the user, a case in which vehicle 2 is moving slowly or a case in which vehicle 2 is about to change its traveling route, display change determiner 28 may determine a display target area from among first display area 41*a* and second display area 42*a* so as to reduce the area that displays the block of the application image (to reduce the area for display). Display change determiner 28 may determine a dividing area for dividing an application image so as to obtain a block that corresponds to the determined display target area. Display change determiner 28 may generate a reduced display event based, for example, on the determined display target area and the determined dividing area. Display change determiner 28 may transmit the generated reduced display event from transmitter 29 to display controller 30.

For example, in the example shown in (b) of FIG. 4, in contrast to the example shown in (a) of FIG. 4, when the driving information indicates a case in which vehicle 2 is in normal traveling, display change determiner 28 may determine a display target area from among first display area 41*a* and second display area 42*a* so as to increase the area that displays the block of the application image (to increase the area for display). Display change determiner 28 may determine a dividing area for dividing an application image so as to obtain a block that corresponds to the determined display target area. Display change determiner 28 may generate an enlarged display event based, for example, on the determined display target area and the determined dividing area. Display change determiner 28 may transmit the generated enlarged display event from transmitter 29 to display controller 30.

Furthermore, as shown in FIG. 5, in accordance with the frame rate estimated based on the processing information pertaining to each of first display area 41*a* and second display area 42*a*, display change determiner 28 determines dividing areas for dividing an application image to obtain blocks that correspond, respectively, to first display area 41*a* and second display area 42*a* such that each dividing area has the aspect ratio equal to each of the resolution of first display area 41*a* and the resolution of second display area 42*a*.

Specifically, display change determiner 28 may determine whether the estimated frame rate is higher than a predetermined threshold value.

For example, as shown in (a) of FIG. 5, when the estimated frame rate is higher than or equal to a predetermined threshold value (when the frame rate is high), display change determiner 28 displays an application image in the display target area dot by dot. The predetermined threshold value is, for example, 60 fps. Therefore, display change determiner 28 may determine dividing areas for dividing the application image to obtain blocks that correspond, respectively, to first display area 41*a* and second display area 42*a*. Display change determiner 28 may designate the entire application image as a dividing area. Display change determiner 28 may generate a dot-by-dot display event for displaying an application image in the display target area dot by dot based on the determined dividing area. In other words, when the estimated frame rate is higher than or equal to the predetermined threshold value, display change determiner 28 may generate a dot-by-dot display event. Display change determiner 28 may transmit the generated dot-by-dot display event from transmitter 29 to display controller 30.

For example, as shown in (b) of FIG. 5, when the estimated frame rate is lower than the predetermined threshold value (when the frame rate is low), display change determiner 28 displays a zoomed-out application image in the display target area. Therefore, display change determiner 28 may determine dividing areas for dividing the application image to obtain blocks that correspond, respectively, to first display area 41*a* and second display area 42*a*. Display change determiner 28 may generate a division adjusted display event for dividing an application image based on the determined dividing area and displaying the divided application image in the display target area. In other words, when the estimated frame rate is lower than the predetermined threshold value, display change determiner 28 may generate a division adjusted display event. Display change determiner 28 may transmit the generated division adjusted display event from transmitter 29 to display controller 30.

Furthermore, when display change determiner 28 has obtained a setting instruction for executing the determination of a dividing area, display change determiner 28 may execute the determination of the dividing area. In other words, when the user has input a setting instruction into operation inputter 21 for executing the determination of a dividing area, display change determiner 28 may be able to set the determination of a dividing area based on the driving information or may be able to set the determination of a dividing area performed in accordance with the estimated frame rate.

Furthermore, as shown in FIG. 6, when at least one of first display area 41*a* or second display area 42*a* corresponds to the display restricted area reserved for displaying the driving related information pertaining to the safety of traveling of vehicle 2, display change determiner 28 determines a dividing area in a display target area other than the display restricted area.

For example, when the image displayed in at least one of first display area 41*a* or second display area 42*a* is the driving related information, display change determiner 28 refrains from setting the at least one of first display area 41*a* or second display area 42*a* that displays the driving related information as the display target area and refrains from determining that at least one area as the dividing area. In this case, the at least one of first display area 41*a* or second display area 42*a* that displays the driving related information continues to display the existing information (the driving related information).

Specifically, in the example illustrated in FIG. 6, third display device 43 displays the driving related information, first display device 41 displays navigation information, and second display device 42 displays entertainment information. In this case, display change determiner 28 refrains from setting third display device 43 displaying the driving related information as the display target area and refrains from determining that area as the dividing area. In this case, third display device 43 displaying the driving related information continues to display the driving related information.

When the image displayed in at least one of first display area 41*a* or second display area 42*a* is not the driving related information, display change determiner 28 sets the display area displaying this image as a display target area and determines a dividing area.

Specifically, in the example shown in FIG. 6, display change determiner 28 sets second display device 42 displaying the entertainment information serving as one example of a block of an application image as a display target area and determines a dividing area. In this case, the navigation information serving as one example of a block of an application image is displayed in second display area 42*a* of second display device 42 displaying the entertainment information.

Display controller 30 controls the display mode of an application image to be displayed in the display target areas of the plurality of display devices 40. In other words, display controller 30 adjusts the divided blocks of an application image divided in accordance with the dividing area such that the divided blocks correspond to first display area 41*a* and second display area 42*a*, and performs controls of displaying the blocks in first display area 41*a* and second display area 42*a*.

Display controller 30 includes receiver 31, zoom controller 32, generator 33, divider 34, enlarger-reducer 35, and combiner 36.

Receiver 31 is a communication module capable of communicating with display change determiner 28. Receiver 31 receives an application image, a display event, a reduced display event or an enlarged display event, a dot-by-dot display event or a division adjusted display event transmitted by transmitter 29 of display change determiner 28. Receiver 31 outputs each of these events received from transmitter 29 of display change determiner 28 to zoom controller 32.

As shown in FIG. 3, in response to receiving each event, zoom controller 32 zooms out or zooms in on (adjusts the zoom of) an obtained application image, as necessary, such that the resulting image has the aspect ratio equal to each of the resolution of first display area 41*a* and the resolution of second display area 42*a*. Zoom controller 32 outputs the zoom-adjusted application image and each event to generator 33. Herein, a zoomed-out application image is illustrated as an example in FIG. 3.

Herein, there may be a case in which zoom controller 32 refrains from adjusting the zoom of an application image. In this case, zoom controller 32 may output an application image to generator 33 without adjusting the zoom of the application image.

In response to obtaining a zoom-adjusted application image and each event from zoom controller 32, generator 33 executes a rendering process for displaying the zoom-adjusted application image in a display area based on the zoom-adjusted application image. Generator 33 outputs the application image subjected to the rendering process and each event to divider 34.

In response to obtaining the application image subjected to the rendering process and each event from generator 33, divider 34 cuts out and divides the application image subjected to the rendering process, based on the display event among the obtained events. Specifically, divider 34 divides the application image to obtain blocks corresponding to first display area 41*a* and second display area 42*a* in accordance with the dividing areas indicated by the display event. Divider 34 outputs each of the divided blocks and each event to enlarger-reducer 35.

In response to obtaining each of the divided blocks and each event from divider 34, enlarger-reducer 35 adjusts each of the divided blocks such that the blocks correspond to first display area 41*a* and second display area 42*a*, based on the display event among the obtained events. For example, enlarger-reducer 35 adjusts the size of each block by increasing or reducing the size while retaining its aspect ratio so that the blocks correspond to first display area 41*a* and second display area 42*a*. Enlarger-reducer 35 outputs each of the adjusted blocks to combiner 36. In the example illustrated in FIG. 3, each of the blocks has been adjusted by being enlarged so that the blocks correspond to first display area 41*a* and second display area 42*a*.

In response to obtaining each of the adjusted blocks from enlarger-reducer 35, combiner 36 executes a combining process and outputs each of the blocks subjected to the combining process to the display target areas of the corresponding target display device. With this operation, the adjusted blocks are displayed in first display area 41*a* of first display device 41 and in second display area 42*a* of second display device 42, as shown in FIG. 3.

Processing Operation

Processing operations of information providing system 10 for vehicles, the information providing method for vehicles, and the program according to the present embodiment will be described with reference to FIG. 7.

Figure 7:
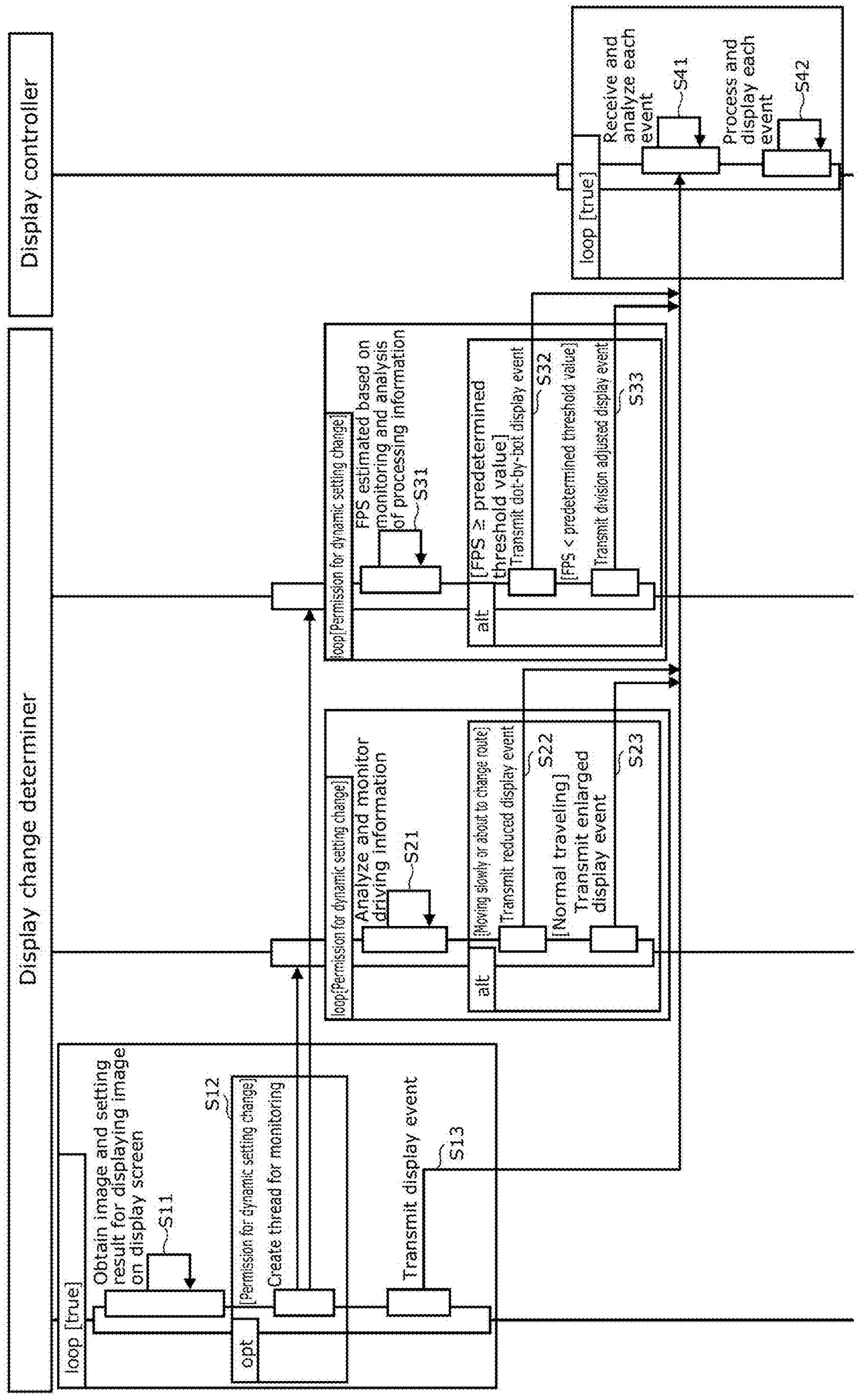
FIG. 7 is a sequence diagram showing a processing operation of an information providing system for vehicles according to an embodiment.

FIG. 7 is a sequence diagram showing a processing operation of information providing system 10 for vehicles according to the embodiment.

First, display change determiner 28 obtains from display setter 24 an image to be displayed in a display target area, setting information set by display setter 24, and setting information set based on the image and the area identification information (S11).

Next, if a dynamic setting change is permitted in the obtained setting information, display change determiner 28 creates a thread for monitoring (S12).

Next, in order to display a block of an application image in a display target area, display change determiner 28 determines the designated display of the application image that serves as the display target area and the display mode of the application image. Furthermore, display change determiner 28 determines the dividing area of a zoomed-out application image such that the dividing area has the aspect ratio equal to each of the resolution of first display area 41*a* and the resolution of second display area 42*a*. At this point, if at least one of first display area 41*a* or second display area 42*a* corresponds to the display restricted area reserved for displaying the driving related information, display change determiner 28 determines the dividing area in a display target area other than the display restricted area. With this configuration, display change determiner 28 determines, as per the content of the setting input provided by the user, the designated display of the application image that serves as the display target area and the display mode indicating the display mode of the application image and the dividing area. Display change determiner 28 transmits a display event indicating the determined display mode and the application image from transmitter 29 to display controller 30 (S13).

Meanwhile, if a dynamic setting change is permitted in the setting information at step S12, display change determiner 28 obtains driving information from driving information obtainer 25 and analyzes and monitors the obtained driving information (S21). In other words, by analyzing driving information each time display change determiner 28 obtains driving information, display change determiner 28 monitors the driving information. Specifically, display change determiner 28 repeatedly monitors, for example, the presence or absence of the driving state of vehicle 2 by the user, the presence or absence of the normal traveling of vehicle 2, or a change in the traveling speed of vehicle 2 each time display change determiner 28 obtains driving information.

For example, in the example shown in (a) of FIG. 4, in contrast to the example shown in (b) of FIG. 4, when the driving information indicates, as the driving state of vehicle 2 by the user, a case in which vehicle 2 is moving slowly or a case in which vehicle 2 is about to change its traveling route, display change determiner 28 determines a display target area from among first display area 41*a* and second display area 42*a* so as to reduce the area that displays the block of the application image. Specifically, if the block of the application image is being displayed in first display area 41*a* and second display area 42*a*, display change determiner 28 determines first display area 41*a* or second display area 42*a* as the display target area. As shown in (a) of FIG. 4, navigation information is displayed in first display device 41 in order to reduce the area that displays the block of the application image.

Furthermore, display change determiner 28 determines the dividing area for dividing the application image so as to obtain a block that corresponds to the determined display target area. Specifically, display change determiner 28 determines the dividing area for dividing the application image to obtain a block that corresponds to first display area 41*a* or second display area 42*a* that serves as the display target area. Display change determiner 28 generates a reduced display event based on the determined display target area and the determined dividing area. Display change determiner 28 transmits the generated reduced display event from transmitter 29 to display controller 30 (S22).

For example, in the example shown in (b) of FIG. 4, in contrast to the example shown in (a) of FIG. 4, when the driving information indicates that vehicle 2 is in the normal traveling, display change determiner 28 determines the display target area from among first display area 41*a* and second display area 42*a* so as to increase the area that displays the block of the application image. Specifically, if the block of the application image is being displayed in first display area 41*a*, display change determiner 28 determines second display area 42*a* as well as first display area 41*a* as the display target area. As shown in (b) of FIG. 4, navigation information (an application image) is displayed in first display device 41 and second display device 42 in order to increase the area that displays the block of the application image.

Furthermore, display change determiner 28 determines the dividing area for dividing the application image so as to obtain a block that corresponds to the determined display target area. Specifically, display change determiner 28 determines the dividing areas for dividing the application image to obtain blocks that correspond, respectively, to first display area 41*a* and second display area 42*a* that serve as the display target areas. Display change determiner 28 generates an enlarged display event based on the determined display target area and the determined dividing area. Display change determiner 28 transmits the generated enlarged display event from transmitter 29 to display controller 30 (S23).

Meanwhile, if a dynamic setting change is permitted in the setting information at step S12, display change determiner 28 obtains the frame rate (FPS) from performance evaluator 27. In other words, by analyzing processing information each time performance evaluator 27 obtains processing information, performance evaluator 27 monitors the processing information (S31). Specifically, performance evaluator 27 monitors a change in the frame rate by estimating the frame rate repeatedly each time performance evaluator 27 obtains driving information.

Furthermore, display change determiner 28 determines whether the estimated frame rate is higher than a predetermined threshold value.

For example, as shown in (a) of FIG. 5, when the estimated frame rate is higher than or equal to a predetermined threshold value, display change determiner 28 generates a dot-by-dot display event for displaying an application image in the display target area dot by dot. Display change determiner 28 transmits the generated dot-by-dot display event from transmitter 29 to display controller 30 (S32).

For example, as shown in (b) of FIG. 5, when the estimated frame rate is lower than the predetermined threshold value, display change determiner 28 generates a division adjusted display event for dividing an application image based on the determined dividing area and adjusting and displaying the divided application image in the display target area. Display change determiner 28 transmits the generated division adjusted display event from transmitter 29 to display controller 30 (S33).

Next, display controller 30 receives the application image and each event. For example, display controller 30 receives the display event of step S13. Furthermore, if the dynamic setting change is permitted in the setting information at step S12, display controller 30 receives the reduced display event or the enlarged display event and the dot-by-dot display event or the division adjusted display event. Display controller 30 analyzes the received application image and each of the received events (S41).

Next, display controller 30 executes the process of each of the events (S42).

Specifically, if display controller 30 is to execute the display event, display controller 30 performs the rendering process by zooming out on the received application image, cuts out each block from the application image subjected to the rendering process in accordance with the dividing area indicated by the display event, and outputs each block to display devices 40 upon adjusting the block so that the block corresponds to the display target area. With this operation, the adjusted blocks are displayed in first display area 41*a* of first display device 41 and in second display area 42*a* of second display device 42, as shown in FIG. 3.

Meanwhile, if display controller 30 is to execute the reduced display event, display controller 30 displays a block in the display target area so as to reduce the area for the display, based, for example, on the display target area and the dividing area determined by display change determiner 28. For example, in (a) of FIG. 4, in order to reduce the area for the display, first display area 41*a* (the display target area) displays the navigation information, and second display area 42*a* displays the entertainment information.

Meanwhile, if display controller 30 is to execute the enlarged display event, display controller 30 displays a block in the display target area so as to increase the area for the display, based, for example, on the display target area and the dividing area determined by display change determiner 28. For example, in (b) of FIG. 4, in order to increase the area for the display, first display area 41*a* and second display area 42*a* (the display target area) display the navigation information.

Meanwhile, if display controller 30 is to execute the dot-by-dot display event, display controller 30 displays the application image dot by dot in the display target area based on the dividing area determined by display change determiner 28. For example, in (a) of FIG. 5, first display area 41*a* and second display area 42*a* display the application image dot by dot.

Meanwhile, if display controller 30 is to execute the division adjusted display event, display controller 30 displays the application image in the form of divided blocks in the display target area based on the dividing area determined by display change determiner 28. For example, in (b) of FIG. 5, the zoomed-out application image is divided to obtain blocks, and the blocks are adjusted and displayed in the display target area.

Herein, the permission for a dynamic setting change at step S12 is optional. Therefore, if the dynamic setting change is not permitted in the setting information as per the setting input provided by the user, display change determiner 28 does not have to execute steps S12 and S21 to S23 and/or S12 and S31 to S33 described above.

Workings and Advantageous Effects

Next, workings and advantageous effects of information providing system 10 for vehicles, the information providing method for vehicles, and the program according to the present embodiment will be described.

With the distribution server according to PTL 1, however, the rendering processing load on the distributor's side increases when the scale of collaboration of a plurality of display devices increases. Therefore, this technology faces shortcomings in that, once the scale of collaboration exceeds the rendering processing capability on the distributor's side, it becomes impossible to display images divided for a plurality of display devices. However, information providing system 10 for vehicles according to the present embodiment is information providing system 10 for vehicles that controls the display mode of an application image to be displayed in first display area 41*a* and second display area 42*a* provided in the vehicle, and information providing system 10 for vehicles includes display change determiner 28 that determines dividing areas for dividing a zoomed-out application image to obtain blocks that correspond, respectively, to first display area 41*a* and second display area 42*a* such that each dividing area has the aspect ratio equal to each of the resolution of first display area 41*a* and the resolution of second display area 42*a*, and display controller 30 that adjusts and displays the block divided in accordance with the dividing area such that the block corresponds to each of first display area 41*a* and second display area 42*a*.

According to this configuration, a wide-view application image generated by zooming out on an application image without a change in the size of the application image is used, and thus an increase in the size of the application image is likely to be curbed. Furthermore, with the use of the wide-view application image, the dividing area can be determined so as to have the aspect ratio equal to each of the resolution of first display area 41*a* and the resolution of second display area 42*a*.

Accordingly, an increase in the rendering processing load in a plurality of collaborating display areas can be curbed.

In particular, as the wide-view application image generated by zooming out on the application image is used, an object in the application image becomes finely divided, and thus even when the block divided in accordance with the dividing area is adjusted and displayed in the display area, the displayed image can be kept from looking coarse.

Furthermore, as the block of the application image can be displayed collaboratively in a plurality of display areas, including first display area 41*a* and second display area 42*a*, improvement in the visibility for the user can be expected.

Meanwhile, the information providing method for vehicles according to the present embodiment is an information providing method for vehicles that controls the display mode of an application image to be displayed in first display area 41*a* and second display area 42*a* provided in vehicle 2, and the information providing method for vehicles includes determining dividing areas for dividing a zoomed-out application image to obtain blocks that correspond, respectively, to first display area 41*a* and second display area 42*a* such that each dividing area has the aspect ratio equal to each of the resolution of first display area 41*a* and the resolution of second display area 42*a*, and adjusting and displaying the blocks divided in accordance with the dividing areas such that the blocks correspond, respectively, to first display area 41*a* and second display area 42*a*.

This method also provides workings and advantageous effects similar to those described above.

Meanwhile, the program according to the present embodiment is a program for causing a computer to execute the information providing method for vehicles.

This program also provides workings and advantageous effects similar to those described above.

Furthermore, in information providing system 10 for vehicles according to the present embodiment, display change determiner 28 determines the dividing areas for dividing the application image to obtain blocks that correspond, respectively, to first display area 41*a* and second display area 42*a* such that each dividing area has the aspect ratio equal to each of the resolution of first display area 41*a* and the resolution of second display area 42*a*, in accordance with the frame rate estimated based on the processing information pertaining to each of first display area 41*a* and second display area 42*a*.

According to this configuration, when the frame rate is sufficiently high (e.g., when the frame rate is equal to or higher than a predetermined threshold value), the usage ratio of, for example, the CPU or the GPU is considered to be low, and thus the application image can be displayed dot by dot.

Meanwhile, when the frame rate is low (e.g., when the frame rate is lower than the predetermined threshold value), the usage ratio of, for example, the CPU or the GPU is considered to be high, and thus with the use of a wide-view application image generated by zooming out on the application image without a change in the size of the application image, the dividing area can be determined so as to have the aspect ratio equal to each of the resolution of first display area 41*a* and the resolution of second display area 42*a*. Therefore, an increase in the rendering processing load in a plurality of collaborating display areas can be curbed.

Furthermore, in information providing system 10 for vehicles according to the present embodiment, display change determiner 28 determines, from among first display area 41*a* and second display area 42*a*, one or more display target areas for displaying a block based on the driving information pertaining to the traveling of vehicle 2, and determines the dividing areas for dividing the application image to obtain one or more blocks corresponding to the determined one or more display target areas such that the one or more blocks have the aspect ratio equal to each of the resolution of first display area 41*a* and the resolution of second display area 42*a*.

According to this configuration, one or more display target areas can be determined in accordance with the traveling state of vehicle 2, and thus the one or more display target areas for displaying the blocks of the application image can be changed dynamically in accordance with the traveling state of vehicle 2. Since the blocks of the application image can be displayed in the one or more collaborating display target areas, improvement in the visibility for the user can be expected.

Furthermore, in information providing system 10 for vehicles according to the present embodiment, when the driving information indicates the driving state of vehicle 2 by the user, display change determiner 28 determines the display target area so as to reduce the area that displays the block of the application image.

According to this configuration, since the user is likely to want to grasp the situation of the road around vehicle 2 when the driving information indicates the driving state of vehicle 2 by the user, the display target area is determined so as to reduce the area that displays the block of the application image. For example, either display area of first display area 41*a* and second display area 42*a* is determined as the display target area. Therefore, the user can grasp the situation of the road around vehicle 2, and thus improvement in the visibility for the user can be expected.

Furthermore, in information providing system 10 for vehicles according to the present embodiment, when the driving information indicates the normal traveling of vehicle 2, display change determiner 28 determines the display target area so as to increase the area that displays the block of the application image.

According to this configuration, since the user is likely to want to grasp the situation of the road extending far from vehicle 2 when vehicle 2 is in the normal traveling, the display target area is determined so as to increase the area that displays the block of the application image. For example, both display areas of first display area 41*a* and second display area 42*a* are determined as the display target areas. Therefore, the user can grasp the situation of the road extending far from vehicle 2, and thus improvement in the visibility for the user can be expected.

Furthermore, in information providing system 10 for vehicles according to the present embodiment, when at least one of first display area 41*a* or second display area 42*a* corresponds to the display restricted area reserved for displaying the driving related information related to the safety of traveling of vehicle 2, display change determiner 28 determines the dividing area in the display target area other than the display restricted area.

According to this configuration, the display restricted area displaying the driving related information can be excluded from the collaboration of the plurality of display areas even if the user provides such a setting input into information providing system 10 for vehicles. Accordingly, information providing system 10 for vehicles can provide the driving related information to the user.

Furthermore, in information providing system 10 for vehicles according to the present embodiment, when display change determiner 28 has obtained a setting instruction for executing the determination of the dividing area, display change determiner 28 executes the determination of the dividing area.

According to this configuration, whether to allow the execution of determining the dividing area such that the dividing area has the aspect ratio equal to each of the resolution of first display area 41*a* and the resolution of second display area 42*a* in accordance with the frame rate can be set based on the user preference.

Furthermore, whether to allow the execution of determining the dividing area such that the dividing area has the aspect ratio equal to each of the resolution of first display area 41*a* and the resolution of second display area 42*a* in accordance with the driving information can be set based on the user preference.

Variation of Embodiment

The present variation differs from the embodiment in that the display target area is redetermined in accordance with the traveling speed of vehicle 2. Other configurations according to the present variation are similar to those of the embodiment, unless specifically indicated otherwise; thus, identical configurations are given identical reference characters, and detailed description of such configurations will be omitted.

First, display system 1 according to the present variation will be described with reference to FIG. 8.

Figure 8:
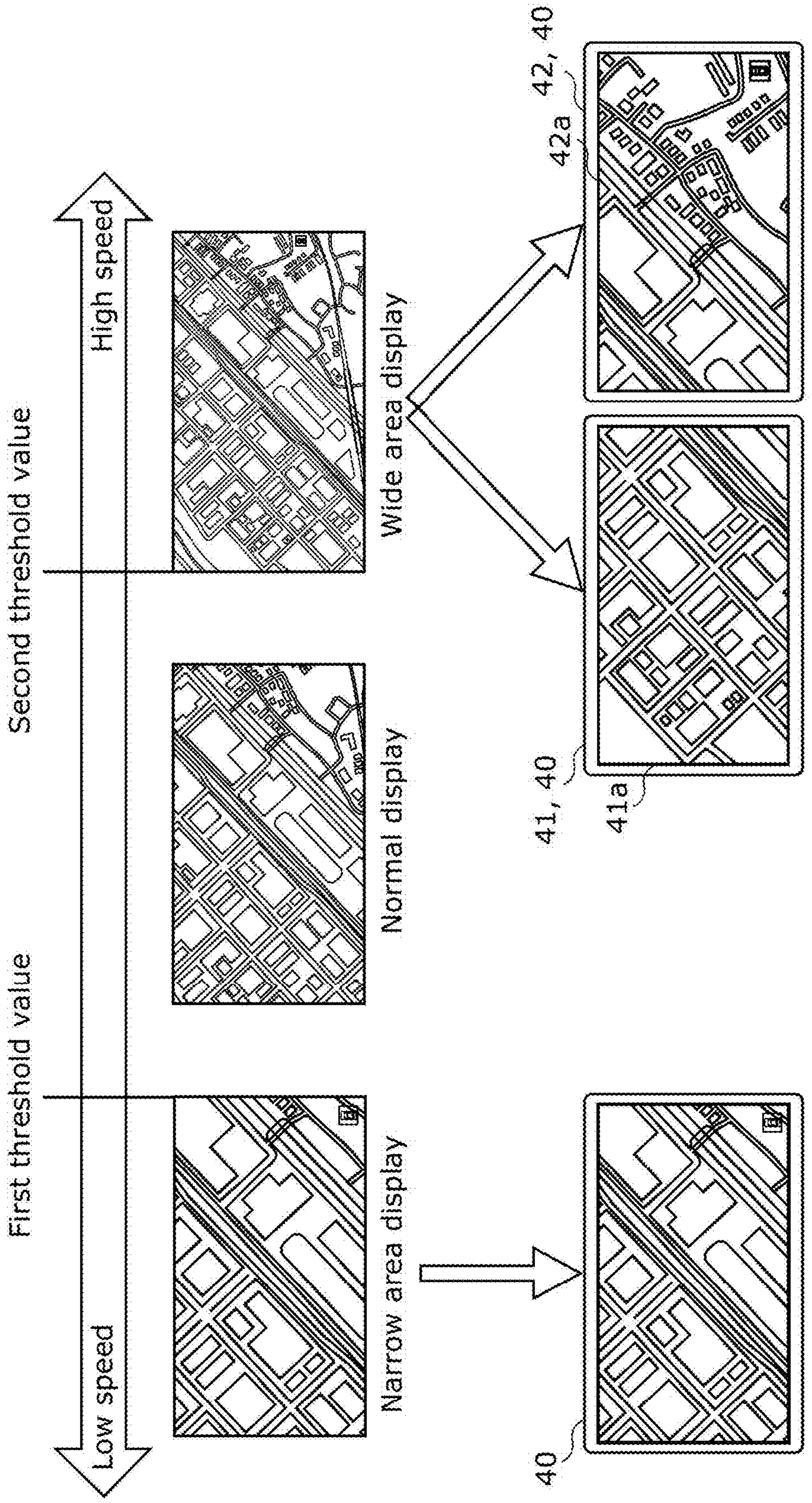
FIG. 8 is a diagram showing how the area in which a block of an application image is displayed is changed in accordance with the traveling speed of the vehicle.

FIG. 8 is a diagram showing how an area in which a block of an application image is displayed is changed in accordance with the traveling speed of vehicle 2.

Display change determiner 28 according to the present variation may redetermine, from among first display area 41*a* and second display area 42*a*, one or more display target areas for displaying a block in accordance with the traveling speed of vehicle 2. Furthermore, display change determiner 28 may determine the dividing areas for dividing an application image to obtain one or more blocks that correspond to the determined one or more display target areas such that the dividing area have the aspect ratio equal to each of the resolution of the one or more display target areas.

For example, as in the narrow area display shown in FIG. 8, display change determiner 28 may determine a display target area from among first display area 41*a* and second display area 42*a* so as to reduce the area that displays a block of the application image as the traveling speed of vehicle 2 decreases.

Specifically, if the traveling speed of vehicle 2 is lower than or equal to a first threshold value, display change determiner 28 may determine a display target area from among first display area 41*a* or second display area 42*a* so as to reduce the area that displays the block of the application image. In the narrow area display shown in FIG. 8, for example, the display magnification of the application image is increased by 200% relative to the magnification of its normal display without a change in the size of the application image. Then, display change determiner 28 may determine the dividing area for dividing the application image to obtain a block that corresponds to each of the determined one or more display target areas. Display change determiner 28 may generate a reduced display event based on the determined one or more display target areas and the determined dividing area. In other words, to obtain the narrow area display shown in FIG. 8, display change determiner 28 may generate a reduced display event if the traveling speed of vehicle 2 is lower than or equal to the first threshold value. Display change determiner 28 may transmit the generated reduced display event from transmitter 29 to display controller 30.

For example, as in the wide area display shown in FIG. 8, display change determiner 28 may determine a display target area from among first display area 41*a* and second display area 42*a* so as to increase the area that displays a block of the zoomed-out application image as the traveling speed of vehicle 2 increases.

Specifically, if the traveling speed of vehicle 2 is higher than a second threshold value, display change determiner 28 may determine first display area 41*a* and second display area 42*a* as the display target areas so as to increase the area that displays the block of the zoomed-out application image. In the wide area display shown in FIG. 8, for example, the display magnification of the zoomed-out application image is reduced by 50% relative to the magnification of its normal display without a change in the size of the zoomed-out application image. Then, display change determiner 28 may determine the dividing areas for dividing the zoomed-out application image to obtain blocks that correspond, respectively, to determined first display area 41*a* and second display area 42*a*. Display change determiner 28 may generate an enlarged display event based on the determined display target area and the determined dividing area. In other words, display change determiner 28 may generate the enlarged display event if the traveling speed of vehicle 2 is higher than the second threshold value. Display change determiner 28 may transmit the generated enlarged display event from transmitter 29 to display controller 30.

For example, as in the normal display shown in FIG. 8, if the traveling speed of vehicle 2 is higher than the first threshold value but lower than or equal to the second threshold value, display change determiner 28 may determine the existing display area as the display target area so as not to change the area that displays the block of the application image. In the normal display shown in FIG. 8, the current display magnification of the application image is retained. Then, display change determiner 28 may determine the dividing area for dividing the application image to obtain a block that corresponds to the determined existing display area. Display change determiner 28 may continue with the display event that is being executed based on the determined display target area and the determined dividing area. In other words, if the traveling speed of vehicle 2 is higher than the first threshold value but lower than or equal to the second threshold value, display change determiner 28 may continue with the display event being executed.

In information providing system 10 for vehicles according to the present variation configured as described above, display change determiner 28 redetermines, from among first display area 41*a* and second display area 42*a*, one or more display target areas for displaying a block based on the traveling speed of vehicle 2, and determines the dividing areas for dividing the application image to obtain one or more blocks corresponding to the one or more determined display target areas such that the dividing area has the aspect ratio equal to each of the resolutions of the one or more display target areas.

According to this configuration, one or more display target areas can be redetermined in accordance with the traveling speed of vehicle 2, and thus the one or more display target areas for displaying the blocks of the application image can be changed dynamically in accordance with the traveling speed of vehicle 2. Since the blocks of the application image can be displayed in the one or more collaborating display target areas, improvement in the visibility for the user can be expected.

Furthermore, in information providing system 10 for vehicles according to the present variation, display change determiner 28 redetermines the display target area so as to increase the area that displays the block of the zoomed-out application image as the traveling speed of vehicle 2 increases.

According to this configuration, since the user is likely to want to grasp the situation of the road extending far from vehicle 2 as the traveling speed of vehicle 2 increases, the display target area can be determined so to as increase the area that displays the block of the application image.

Accordingly, the user can grasp the situation of the road extending far from vehicle 2 as the traveling speed of vehicle 2 increases.

Furthermore, since the user is likely to want to grasp the situation of the road around vehicle 2 as the traveling speed of vehicle 2 decreases, the display target area can be determined so as to reduce the area that displays the block of the application image showing the vicinity of vehicle 2.

Accordingly, the user can grasp the situation of the road around vehicle 2 as the traveling speed of vehicle 2 decreases.

Thus, improvement in the visibility for the user can be expected.

Other Variations

Thus far, the information providing system for vehicles, the information providing method for vehicles, and the program according to the present disclosure have been described based on the foregoing embodiment and the variation of the embodiment. The embodiment and the variation of the embodiment, however, do not limit the present disclosure. Unless departing from the spirit of the present disclosure, an embodiment obtained by making variation modifications that a person skilled in the art can conceive of to the embodiment and the variation of the embodiment may also be encompassed by the scope of the present disclosure.

For example, the display restricted area determiner, the display setter, the driving information obtainer, the performance evaluator, and the information providing system for vehicles, and so on included in the information providing systems for vehicles, the information providing methods for vehicles, and the programs according to the embodiment and the variation of the embodiment are implemented typically in the form of an LSI circuit, which is an integrated circuit. The components above may each be implemented by a single chip, or a part or the whole of these components may be implemented by a single chip.

The circuit integration is not limited to LSI, and an integrated circuit may be implemented by a dedicated circuit or a general purpose processor. A field programmable gate array (FPGA) that can be programmed after the LSI circuit has been manufactured or a reconfigurable processor in which the connections or the settings of the circuit cells within the LSI circuit can be reconfigured may also be used.

In the foregoing embodiment and variation of the embodiment, the constituent elements may each be implemented by a dedicated piece of hardware or may each be implemented through the execution of a software program suitable for the corresponding constituent element. Each of the constituent elements may be implemented as a program executing unit, such as a CPU or a processor, reads out a software program recorded on a recording medium, such as a hard disk or a semiconductor memory, and executes the software program.

All the numbers use above are for illustrating examples for describing the present disclosure in concrete terms, and the embodiment and the variation of the embodiment of the present disclosure are not limited to the illustrated numbers.

The division of the functional blocks in the block diagram is merely an example. A plurality of functional blocks may be implemented as a single functional block, a single functional block may be divided into a plurality of functional blocks, or one or more of the functions may be transferred to another functional block. The functions of a plurality of functional blocks having similar functions may be processed in parallel or through time division by a single piece of hardware or software.

The order of executing the steps in the flowchart is for illustrating an example for describing the present disclosure in concrete terms, and the order may differ from the one described above. Some of the steps may be executed simultaneously (in parallel) with another step.

It is to be noted that an embodiment obtained by making various modifications that a person skilled in the art can conceive of to the foregoing embodiment and the variation of the embodiment or an embodiment achieved by combining, as desired, the constituent elements and the functions of the embodiment and the variation of the embodiment within the scope that does not depart from the spirit of the present disclosure is also encompassed by the present disclosure.

Supplementary Notes

Features of the information providing system for vehicles, the information providing method for vehicles, and the program described above based on the foregoing embodiment and the variation of the embodiment are noted below.

Technique 1

An information providing system for vehicles that controls a display mode of an application image to be displayed in a first display area and a second display area provided in a vehicle, the information providing system for vehicles comprising:

a display change determiner that determines dividing areas for dividing the application image that is zoomed out, to obtain blocks that correspond, respectively, to the first display area and the second display area, such that the dividing areas have an aspect ratio equal to each of a resolution of the first display area and a resolution of the second display area; and a display controller that adjusts and displays the blocks divided in accordance with the dividing areas to correspond, respectively, to the first display area and the second display area.

Technique 2

The information providing system for vehicles according to Technique 1, wherein the display change determiner determines the dividing areas for dividing the application image to obtain the blocks that correspond, respectively, to the first display area and the second display area such that the dividing areas have the aspect ratio equal to each of the resolution of the first display area and the resolution of the second display area, in accordance with a frame rate estimated based on processing information pertaining to each of the first display area and the second display area.

Technique 3

The information providing system for vehicles according to Technique 1, wherein the display change determiner:

determines, from among the first display area and the second display area, one or more display target areas for displaying the blocks, based on driving information pertaining to traveling of the vehicle; and determines the dividing areas for dividing the application image to obtain the blocks that correspond, respectively, to the one or more display target areas determined, such that the dividing areas have the aspect ratio equal to each of the resolution of the first display area and the resolution of the second display area.

Technique 4

The information providing system for vehicles according to Technique 3, wherein when the driving information indicates a driving state of the vehicle by a user, the display change determiner determines the one or more display target areas to reduce an area that displays the block of the application image.

Technique 5

The information providing system for vehicles according to Technique 3, wherein when the driving information indicates normal traveling of the vehicle, the display change determiner determines the one or more display target areas to increase an area that displays the block of the application image.

Technique 6

The information providing system for vehicles according to any one of Techniques 1 to 5, wherein when at least one of the first display area or the second display area corresponds to a display restricted area reserved for displaying driving related information related to safety of traveling of the vehicle, the display change determiner determines the dividing area in a display target area other than the display restricted area.

Technique 7

The information providing system for vehicles according to any one of Techniques 1 to 5, wherein when the display change determiner obtains a setting instruction for executing determining of the dividing area, the display change determiner executes the determining of the dividing area.

Technique 8

The information providing system for vehicles according to any one of Techniques 1 to 7, wherein the display change determiner:

redetermines one or more display target areas for displaying the block from among the first display area and the second display area in accordance with a traveling speed of the vehicle; and determines the dividing areas for dividing the application image to obtain the blocks that correspond, respectively, to the one or more display target areas determined, such that the dividing areas have an aspect ratio equal to each of resolutions of the one or more display target areas.

Technique 9

The information providing system for vehicles according to Technique 8, wherein the display change determiner redetermines the one or more display target areas to increase an area that displays the block of the application image that is zoomed out as the traveling speed of the vehicle increases.

Technique 10

An information providing method for vehicles that controls a display mode of an application image to be displayed in a first display area and a second display area provided in a vehicle, the information providing method for vehicles comprising:

determining dividing areas for dividing the application image that is zoomed out, to obtain blocks that correspond, respectively, to the first display area and the second display, such that the dividing areas have an aspect ratio equal to each of a resolution of the first display area and a resolution of the second display area; and adjusting and displaying the blocks divided in accordance with the dividing areas to correspond, respectively, to the first display area and the second display area.

Technique 11

A program for causing a computer to execute the information providing method for vehicles according to Technique 10.

Further Information About Technical Background to This Application

The disclosures of the following patent applications including specification, drawings, and claims are incorporated herein by reference in their entirety: Japanese Patent Application No. 2022-142923 filed on Sep. 8, 2022, and PCT/JP2023/029462 filed on Aug. 14, 2023.

INDUSTRIAL APPLICABILITY

The present disclosure can be used, for example, in vehicles provided with a plurality of display devices and in apparatuses and systems, other than vehicles, provided with a plurality of display devices.

The invention claimed is:

1. A vehicle information providing system configured to control a display mode of an application image to be displayed in a first display area and a second display area disposed in a vehicle, the vehicle information providing system comprising:

a processor; and a memory including a program that, when executed by the processor, causes the processor to:

acquire processing information relating to each of the first display area and the second display area;

estimate, prior to rendering processing of the application image, a frame rate for each of the first display area and the second display area based on the acquired processing information, to determine estimated frame rates; and determine dividing areas for dividing a zoomed-out application image into blocks corresponding to the first display area and the second display area, respectively, such that each of the blocks has an aspect ratio equal to a resolution of the corresponding one of the first display area and the second display area, wherein the processor determines the dividing areas in accordance with the estimated frame rates, such that the zoomed-out application image is divided into the blocks corresponding to the first display area and the second display area based on the estimated frame rates.

2. The vehicle information providing system according to claim 1, wherein the processor:

determines, from among the first display area and the second display area, one or more display target areas for displaying the blocks, based on driving information pertaining to traveling of the vehicle; and determines the dividing areas for dividing the zoomed-out application image into the blocks that correspond, respectively, to the one or more display target areas determined, such that each of the blocks has the aspect ratio equal to the resolution of the corresponding one of the first display area and the second display area.

3. The vehicle information providing system according to claim 2, wherein when the driving information indicates a driving state of the vehicle by a user, the processor determines the one or more display target areas to reduce an area that displays the blocks of the zoomed-out application image.

4. The vehicle information providing system according to claim 2, wherein when the driving information indicates normal traveling of the vehicle, the processor determines the one or more display target areas to increase an area that displays the blocks of the zoomed-out application image.

5. The vehicle information providing system according to claim 1, wherein when at least one of the first display area or the second display area corresponds to a display restricted area reserved for displaying driving related information related to safety of traveling of the vehicle, the processor determines the dividing areas in a display target area other than the display restricted area.

6. The vehicle information providing system according to claim 1, wherein when the processor obtains a setting instruction for executing determining of the dividing areas, the processor executes the determining of the dividing areas.

7. The vehicle information providing system according to claim 1, wherein the processor:

redetermines one or more display target areas for displaying the blocks from among the first display area and the second display area in accordance with a traveling speed of the vehicle; and determines the dividing areas for dividing the zoomed-out application image into the blocks corresponding to the one or more display target areas determined, such that each of the blocks has an aspect ratio equal to a resolution of the corresponding one of the one or more display target areas.

8. The vehicle information providing system according to claim 7, wherein the processor redetermines the one or more display target areas to increase an area that displays the blocks of the zoomed-out application image as the traveling speed of the vehicle increases.

9. A vehicle information providing method configured to control a display mode of an application image to be displayed in a first display area and a second display area disposed in a vehicle, the vehicle information providing method comprising:

estimating, prior to rendering processing of the application image, a frame rate for each of the first display area and the second display area; and determining dividing areas for dividing a zoomed-out application image into blocks corresponding to the first display area and the second display, respectively, such that each of the blocks has an aspect ratio equal to a resolution of the corresponding one of the first display area and the second display area, wherein the dividing areas are determined in accordance with the estimated frame rates for the first display area and the second display area.

10. A non-transitory computer-readable recording medium having recorded thereon a program for causing a computer to execute the vehicle information providing method according to claim 9.

* * * * *